Sept. 15, 1925.
J. K. E. DIFFENDERFFER ET AL
1,553,851
AUTOMOBILE PARKING DEVICE
Filed Sept. 11, 1923
11 Sheets-Sheet 1

Sept. 15, 1925.
J. K. E. DIFFENDERFFER ET AL
AUTOMOBILE PARKING DEVICE
Filed Sept. 11, 1923  11 Sheets-Sheet 6

1,553,851

Inventor
J.K.E.Diffenderffer
V.P.Williams
M.S.F.Williams
By
Attorney

Sept. 15, 1925.  1,553,851
J. K. E. DIFFENDERFFER ET AL
AUTOMOBILE PARKING DEVICE
Filed Sept. 11, 1923   11 Sheets-Sheet 7

Inventor
J.K.E. Diffenderffer
V.P. Williams
M.S.F. Williams
By
Attorney

Sept. 15, 1925. 1,553,851
J. K. E. DIFFENDERFFER ET AL
AUTOMOBILE PARKING DEVICE
Filed Sept. 11, 1923 11 Sheets-Sheet 8

Inventors
J. K. E. Diffenderffer
V. P. Williams
M. S. F. Williams
By
Attorney

Sept. 15, 1925.
J. K. E. DIFFENDERFFER ET AL
AUTOMOBILE PARKING DEVICE
Filed Sept. 11, 1923     11 Sheets-Sheet 9
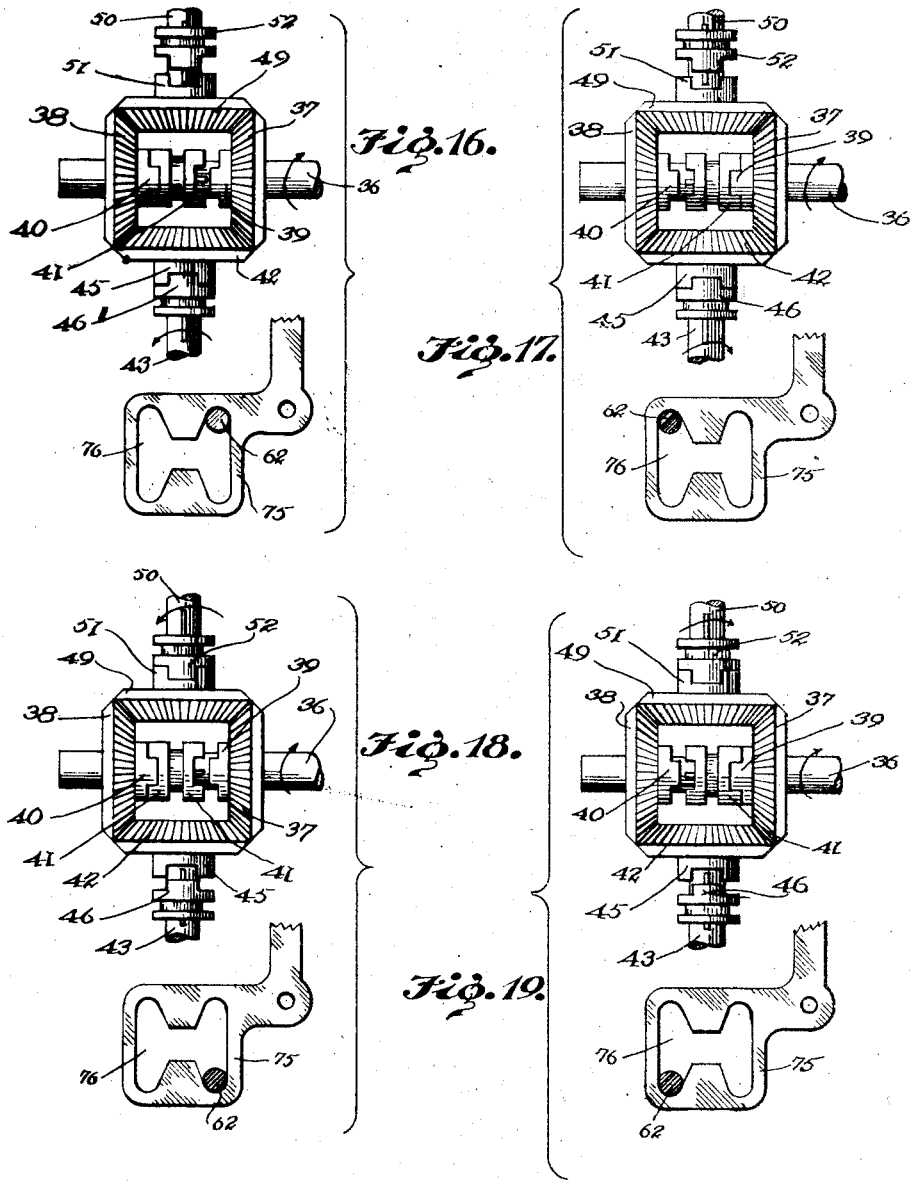

Sept. 15, 1925.
J. K. E. DIFFENDERFFER ET AL
1,553,851
AUTOMOBILE PARKING DEVICE
Filed Sept. 11, 1923     11 Sheets-Sheet 10
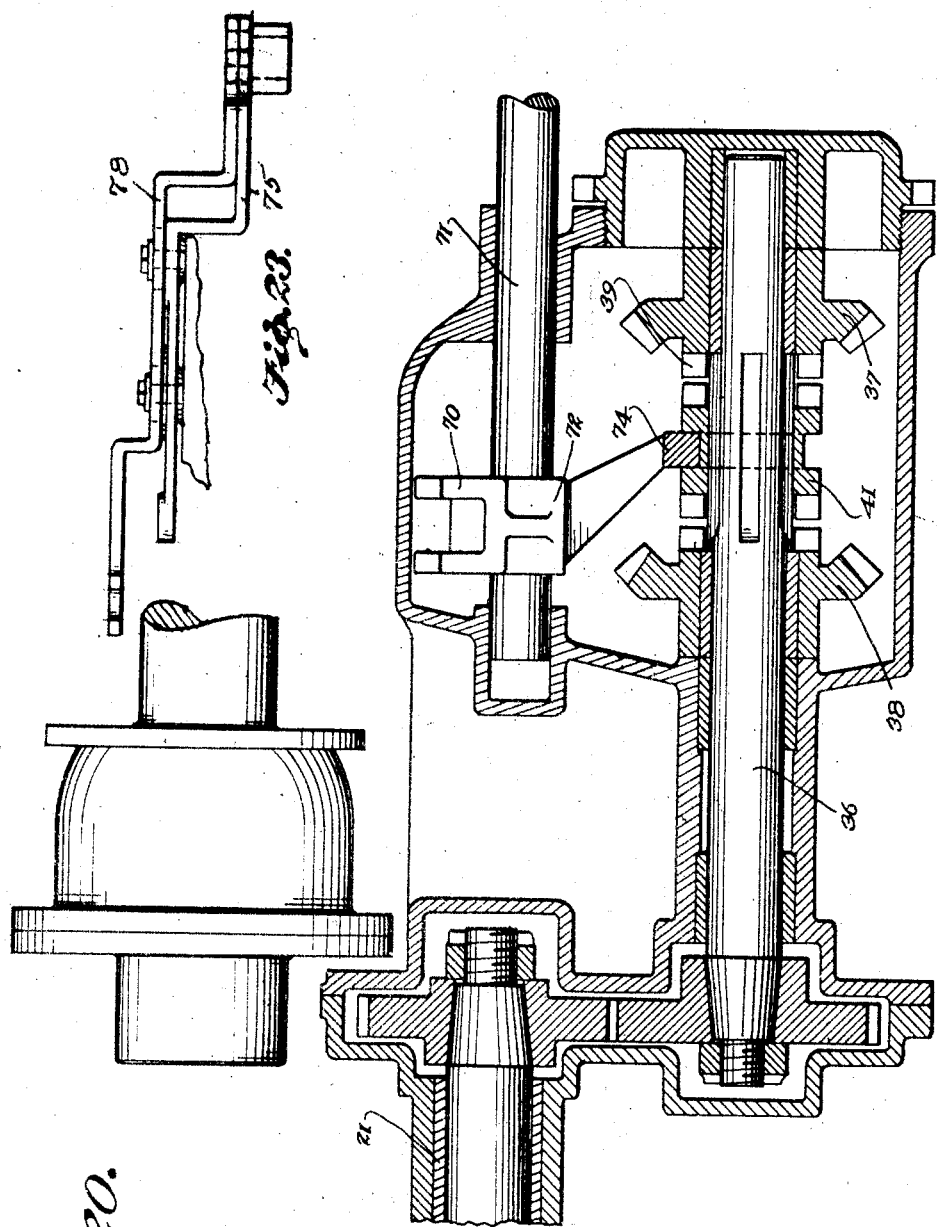

Sept. 15, 1925. 1,553,851
J. K. E. DIFFENDERFFER ET AL
AUTOMOBILE PARKING DEVICE
Filed Sept. 11, 1923 11 Sheets-Sheet 11

Inventor
J. K. E. Diffenderffer
V. P. Williams
M. S. F. Williams
By L. N. Lilly
Attorney

Patented Sept. 15, 1925.

1,553,851

UNITED STATES PATENT OFFICE.

JOHN K. E. DIFFENDERFFER, VILLOR P. WILLIAMS, AND MIRIAM S. F. WILLIAMS, OF BALTIMORE, MARYLAND; SAID DIFFENDERFFER AND SAID VILLOR P. WILLIAMS ASSIGNORS OF THEIR ENTIRE RIGHTS TO MIRIAM S. F. WILLIAMS, OF BALTIMORE, MARYLAND.

AUTOMOBILE PARKING DEVICE.

Application filed September 11, 1923. Serial No. 662,078.

*To all whom it may concern:*

Be it known that we, JOHN K. E. DIFFENDERFFER, VILLOR P. WILLIAMS, and MIRIAM S. F. WILLIAMS, respectively, citizens of the United States, Rumania, and Canada, residing at Baltimore, in the county of Baltimore City and State of Maryland, have invented certain new and useful Improvements in Automobile Parking Devices, of which the following is a specification.

This invention relates to parking devices for automobiles, and has special reference to improvements on the parking device for automobiles, for which application for Letters Patent of the United States was filed by Miriam S. F. Williams and J. K. E. Diffenderffer on March 24, 1922, under the Serial Number 546,241, and resulted in Patent Number 1,475,369, issued November 6, 1923.

One important object of this invention is to improve and simplify the general construction of the device illustrated in the prior application, Engineering experience has disclosed that certain of the features of the parking device of the prior application could, while retaining the general principles there involved, be changed in their details and arrangements to greatly decrease the cost of installation and simplify the mechanism involved.

A second important object of the invention is to provide an improved device of this character wherein the construction will be of great simplicity, and in which the parts will be so arranged that they may be installed without difficulty on an ordinary automobile.

A third important object of the invention is to provide a device of this character wherein the control of the different operations will be accomplished by an extremely simple mechanism.

A fourth important object of the invention is to provide a device of this character wherein the movement of a single controlling lever in selected directions will so control the mechanism of the invention that, when the same is applied to an automobile, the automobile will be raised or lowered from the ground and may be moved sideways in either direction at will and without the operator leaving his seat.

A fifth important object of the invention is to provide novel braking means for controlling the lateral movement of the automobile.

A sixth important object of the invention is to provide improved and simplifying means for simultaneously actuating all of the jacks used in connection with this device.

A seventh important object of the invention is to provide a novel and improved mechanism for preventing too great movement of said shaft.

An eighth important object of the invention is to provide an improved means for operating the jack ground wheels in this device to produce lateral movement in either direction.

A ninth important object of the invention is to provide an improved safety mechanism for the single control lever which actuates the several clutches in the device.

With the above and other objects in view as will be hereinafter apparent, the invention consists in general of certain novel details of construction and combinations of parts hereinafter more fully described, illustrated in the accompanying drawings and specifically claimed.

In the accompanying drawing like characters of reference indicate like parts in the several views, and:

Fig. 15 is a detail side view of the stop or throw out mechanism used to prevent excessive movement of the jacks.

Fig. 16 is a diagrammatic view illustrating the relationship between the clutch device and the single operating lever in one position.

Fig. 17 is a similar view to Fig. 16 showing the reversing of the shaft driven in Fig. 16.

Fig. 18 is a similar view to Fig. 16 showing the selective driving of another shaft.

Fig. 19 is a view similar to Fig. 18 showing the second shaft reversed.

Fig. 20 is a view showing the drive from the differential.

Figure 1:
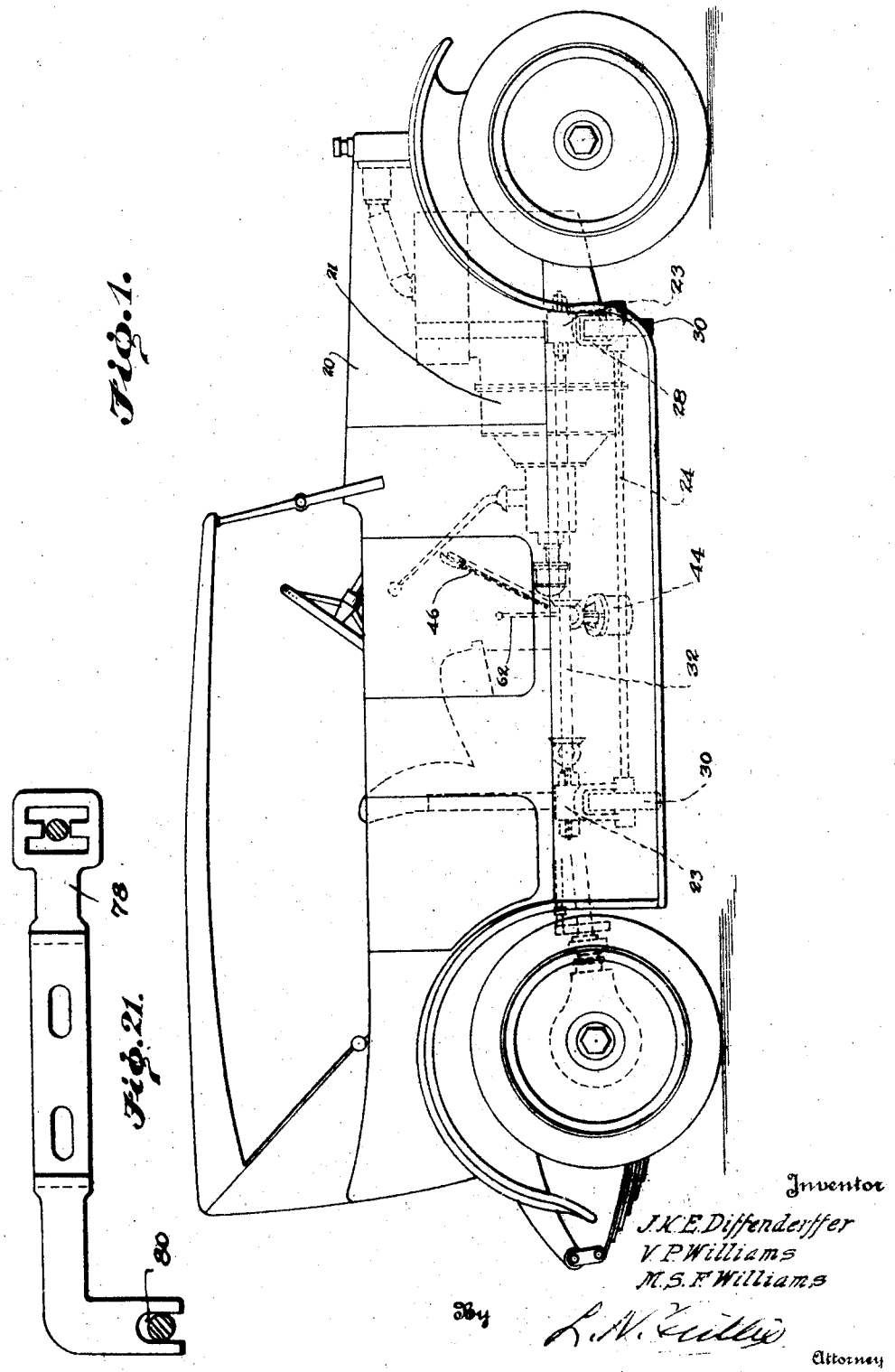
Fig. 1 is a side elevation of an automobile showing the device applied thereto, and illustrating in dotted lines the general outline of the invention.
Figure 2:
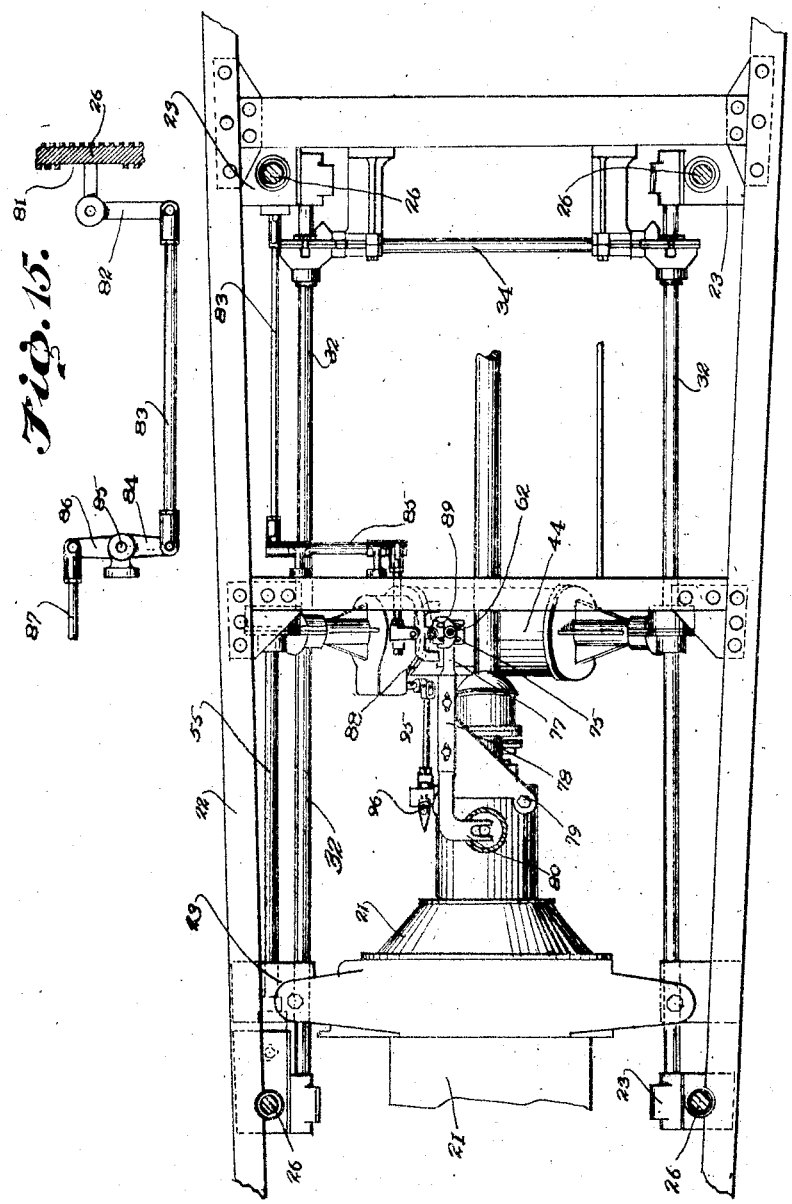
Fig. 2 is a plan view of a portion of an automobile frame showing the invention installed thereon.
Figure 3:
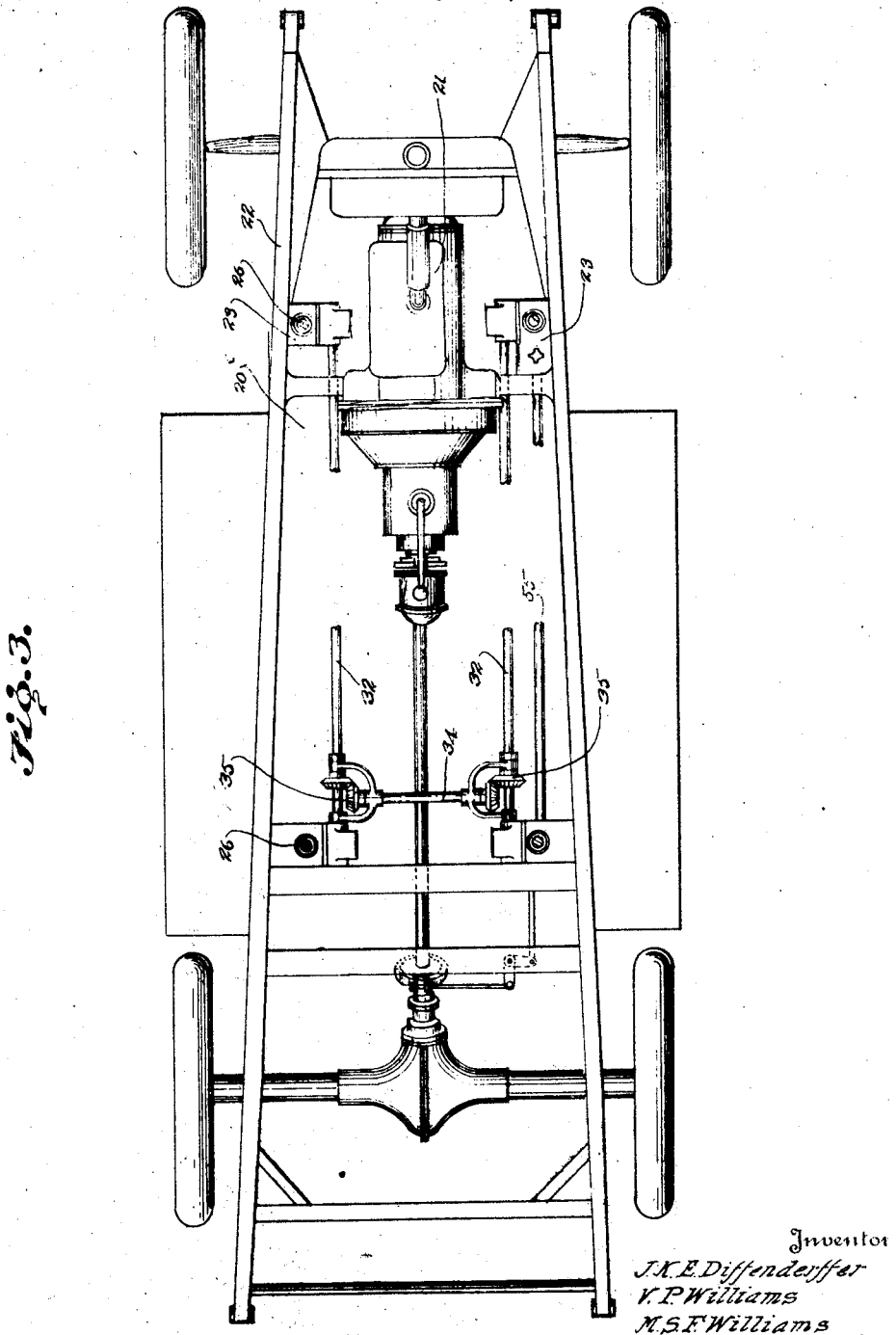
Fig. 3 is a top plan view of the automobile with the invention installed, parts of the latter being broken away to show the mechanism below.
Figure 4:
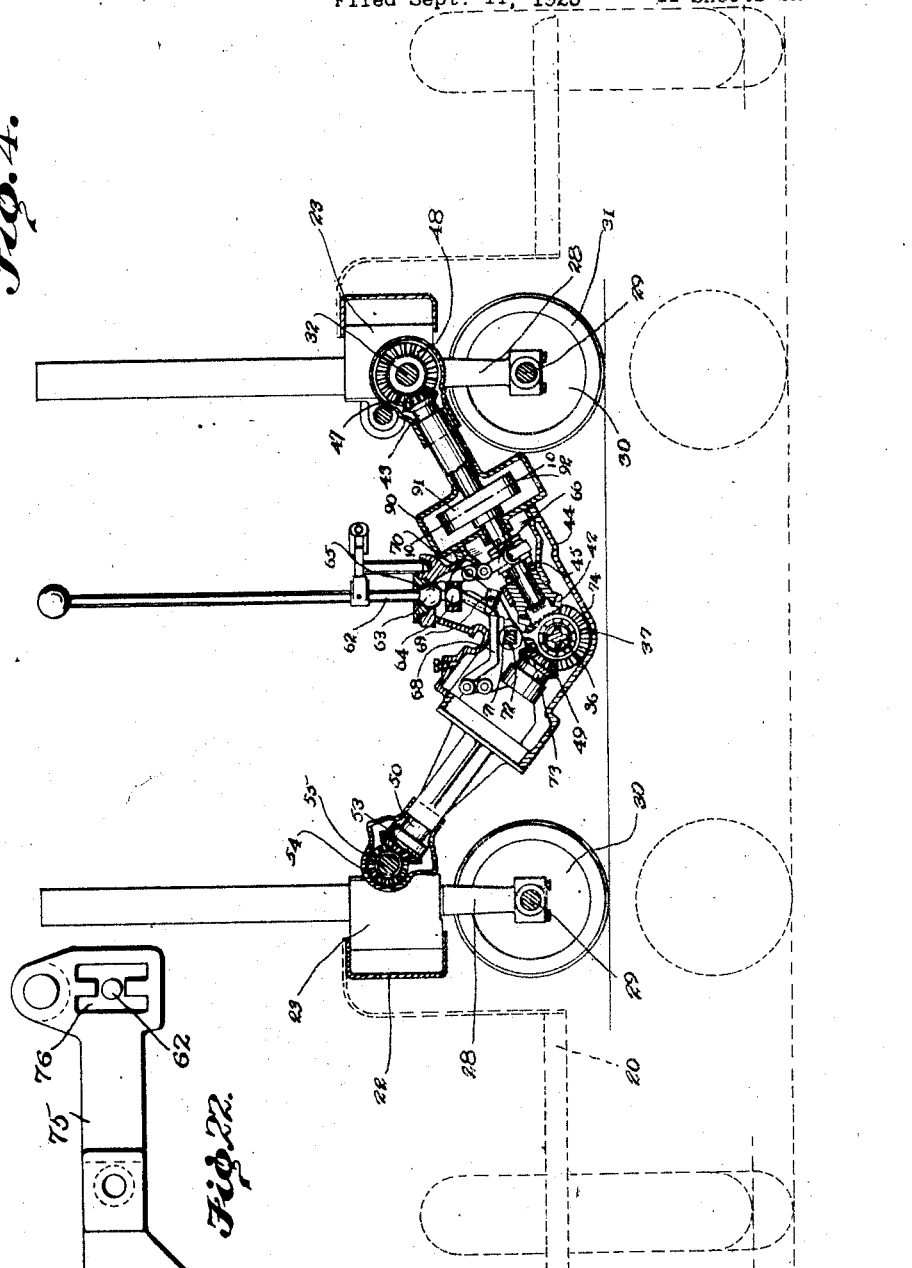
Fig. 4 is an enlarged detail transverse section through the main portion of the mechanism.
Figure 5:
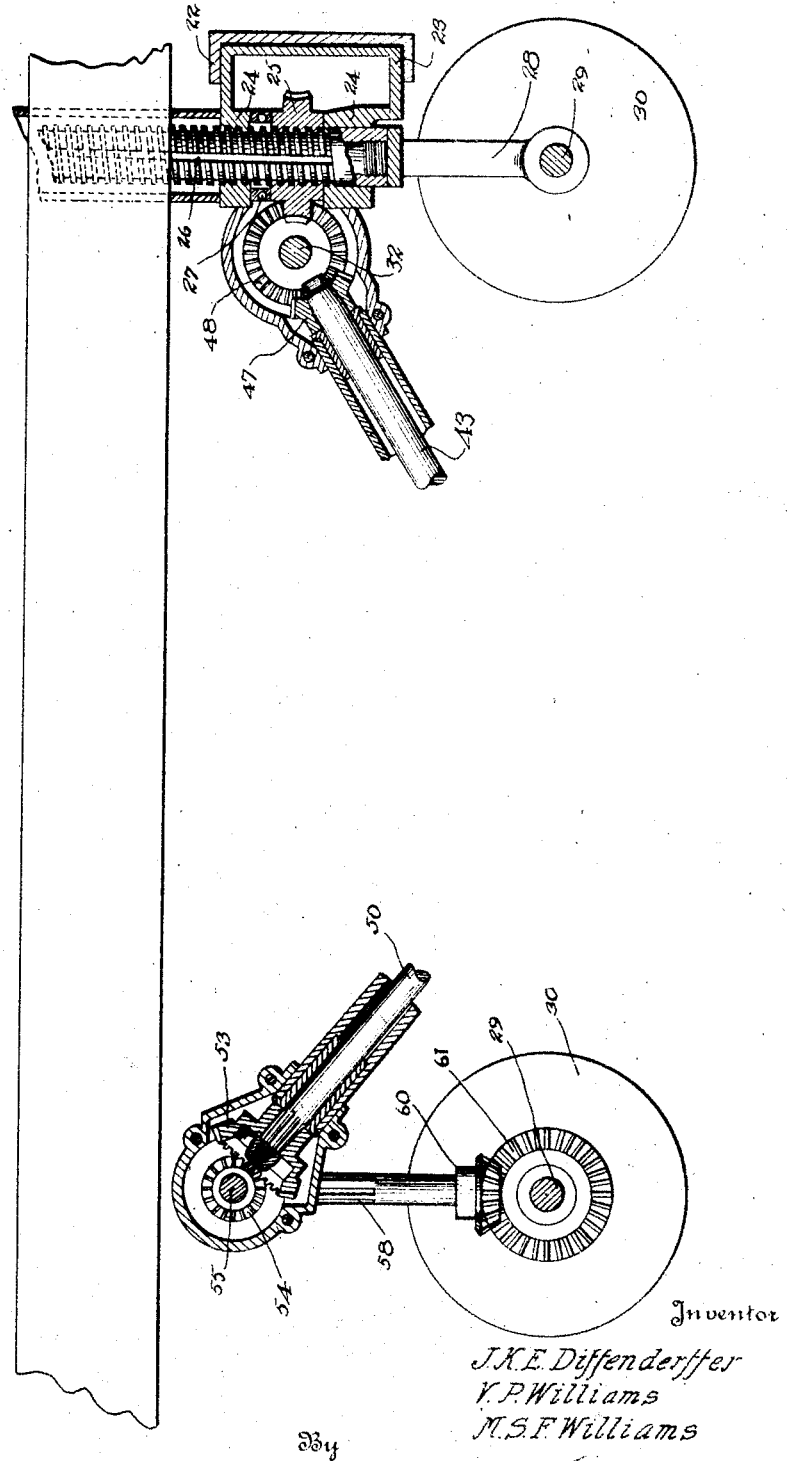
Fig. 5 is a detail view showing the connection of the inclined shafts to the main horizontal shafts.

In the embodiment of the invention herein illustrated, it will be seen that there is disclosed an ordinary touring car 20 having a power plant 21. This touring car is provided with the usual frame 22 which supports on each side a pair of jacks, two of these jacks being positioned forwardly and two rearwardly. Each of these jacks includes a fixed jack head or housing 23, which is firmly secured to the side members of the frame 22, and in which is provided a pair of vertically alined bearings 24. Between the bearings 24 in each housing or jack head is located a worm wheel 25 having a threaded opening extending therethrough for the reception of the threaded upper end 26 of a jack standard. This worm wheel is supported above by suitable anti-friction thrust bearings 27, and the standard projects downward and carries on its lower end a yoke 28 wherein is journalled a shaft 29 supporting a ground wheel 30 provided with a suitable tire 31 of rubber or the like. The heads 23 on each side are connected by an upper longitudinal shaft 32 which carries adjacent each end a worm 33 meshing with the respective worm wheel 25. There is also provided a transverse shaft 34 which is suitably geared to the shafts 32, as by bevel gearings 35. Thus rotation of one of the shafts 32 affects rotation of the other, and consequently, through the action of the worm and worm wheel, the jacks will be raised or lowered according to the direction in which the respective shafts 32 rotate.

Driven from the power plant 21 is a shaft 36 whereon is revolubly mounted a pair of confronting bevel gears 37 and 38, each of which is provided with a clutch face indicated respectively at 39 and 40. Splined on the shaft 36 between the clutch faces 39 and 40 is a clutch member 41. From this construction it will be seen that when the member 41 is moved in one direction, the bevel gear 37 will be locked on the shaft 36 while, movement of the member 41 in the opposite direction, will lock the bevel gear 38 on the shaft 36. These two bevel gears are so arranged that they mesh with a bevel gear 42 on opposite sides thereof. Under these circumstances, it will be obvious that this bevel gear 42 may be rotated in one direction or the other in accordance with the engagement of one or the other of the gears 37 and 38 to the shaft 36. This gear 42 is revolubly mounted on the lower end of an inclined shaft 43 which is suitably journalled in the main housing 44 of the driving mechanism for the parking device. Furthermore, the gear 42 is provided on its upper end with a clutch member 45 and splined on the shaft 43 is a clutch member 46 by means of which the gear 42 may be clutched to and unclutched from the shaft 43. At the upper end of this shaft 43 there is fixed a bevel gear 47 which meshes with a similar bevel gear 48 fixed upon one of the shafts 32.

It will now be obvious that by means of the construction just described, the rotation of the shaft 36 can be transmitted to the shaft 32 in such manner that this shaft can be caused to revolve in either direction at will, by the proper manipulation of the clutches.

Figure 6:
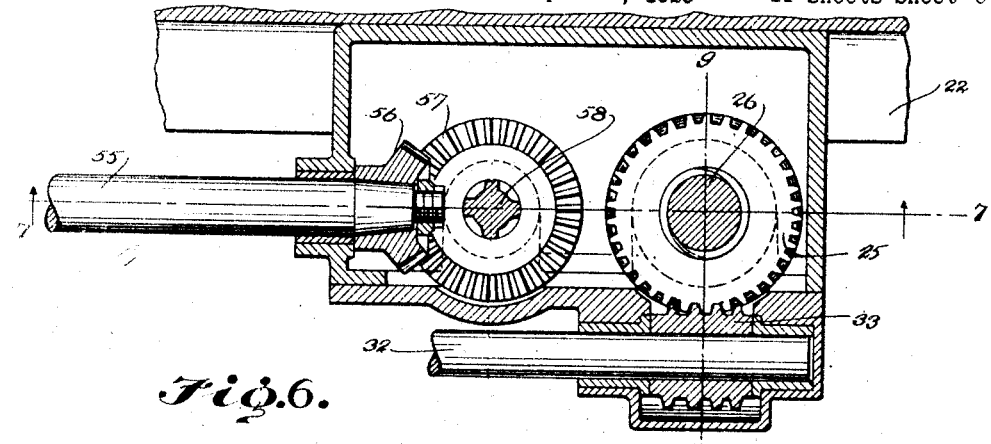
Fig. 6 is a horizontal section through one of the fixed jack heads.
Figure 7:
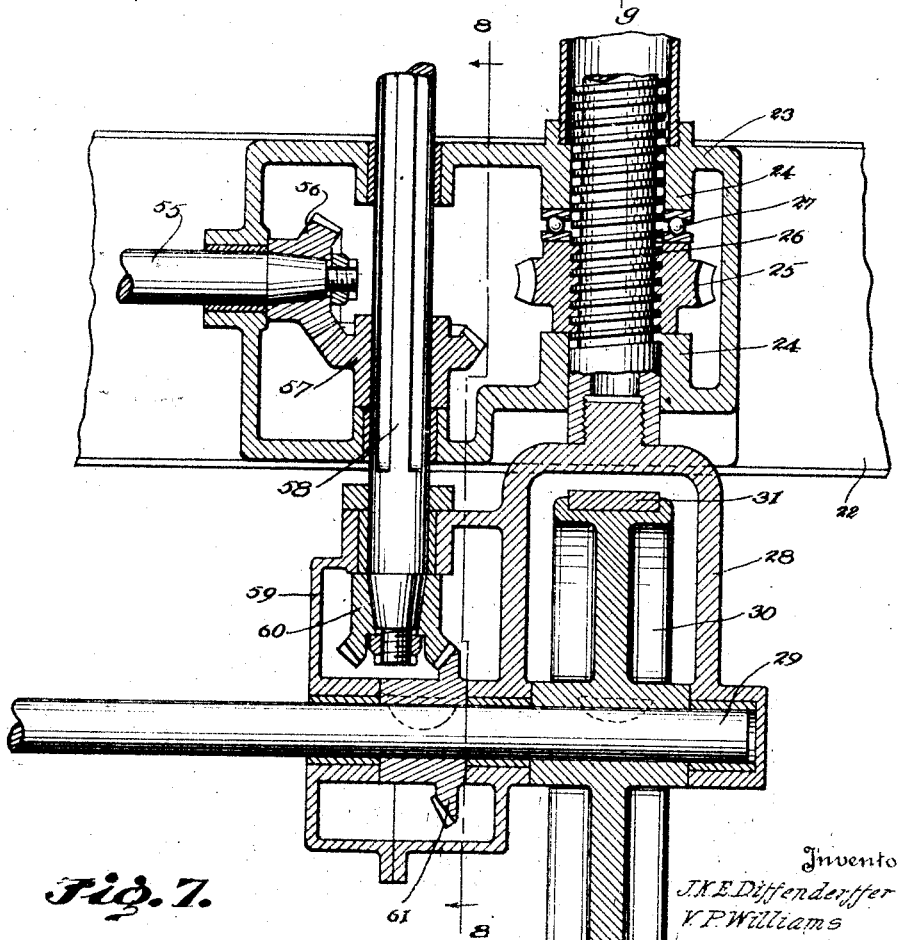
Fig. 7 is a section on the line 7—7 of Fig. 6.
Figure 9:
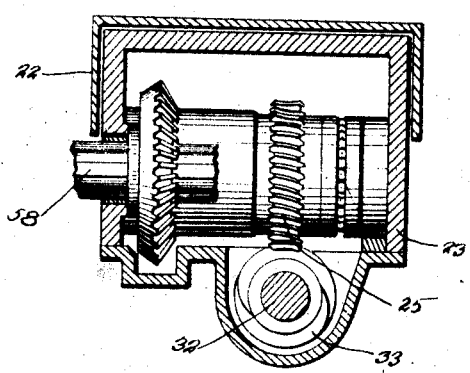
Fig. 9 is a section on the line 9—9 of Fig. 6.
Figure 10:
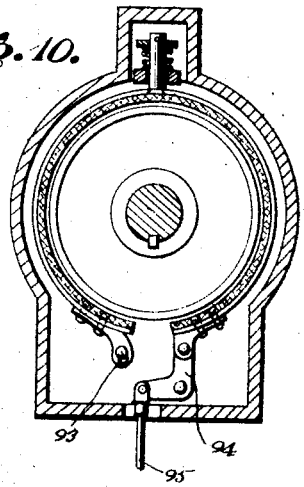
Fig. 10 is a section on the line 10—10 of Fig. 4.
Figure 8:
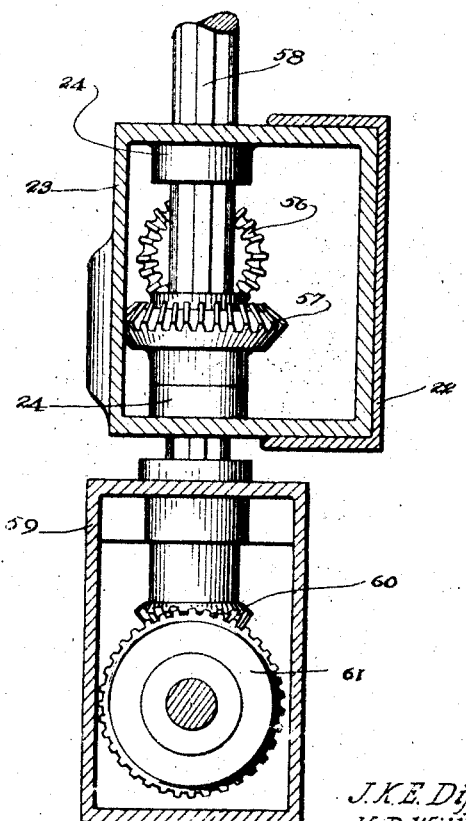
Fig. 8 is a section on the line 8—8 of Fig. 7.
Figure 11:
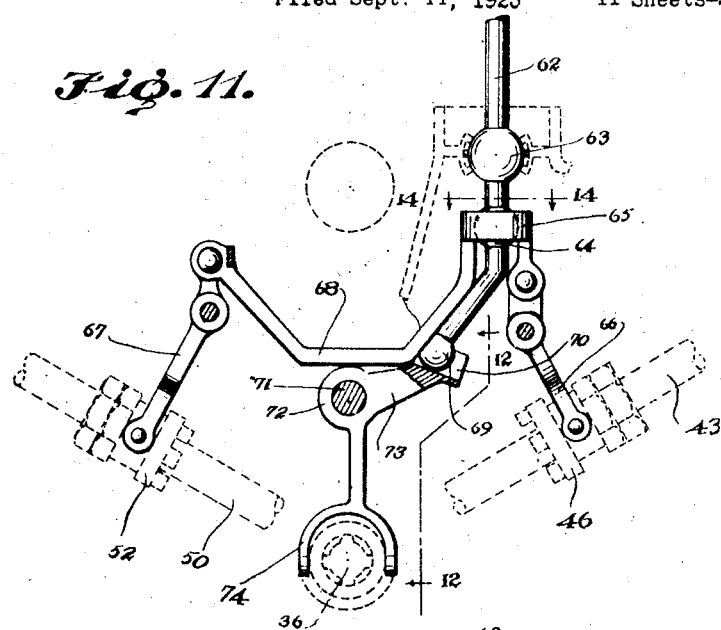
Fig. 11 is an enlarged detail view of the single lever clutch controlled mechanism supported from the rear of the device.
Figure 13:
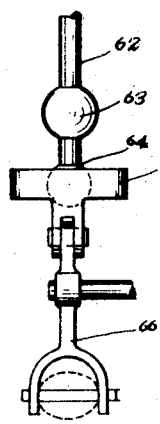
Fig. 13 is a partial side elevation looking from the right of Fig. 11.
Figure 12:
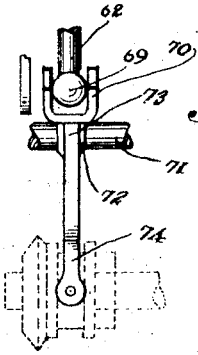
Fig. 12 is a detail view on the line 12—12 of Fig. 11.
Figure 14:
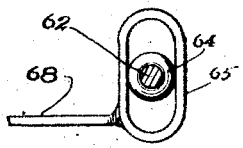
Fig. 14 is a detail section on the line 14—14 of Fig. 11.
Figure 21:
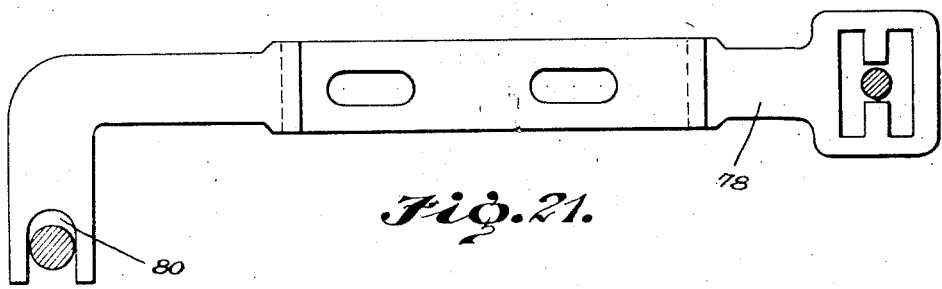
Figs. 21 to 23 are views of certain control levers.
Figure 22:
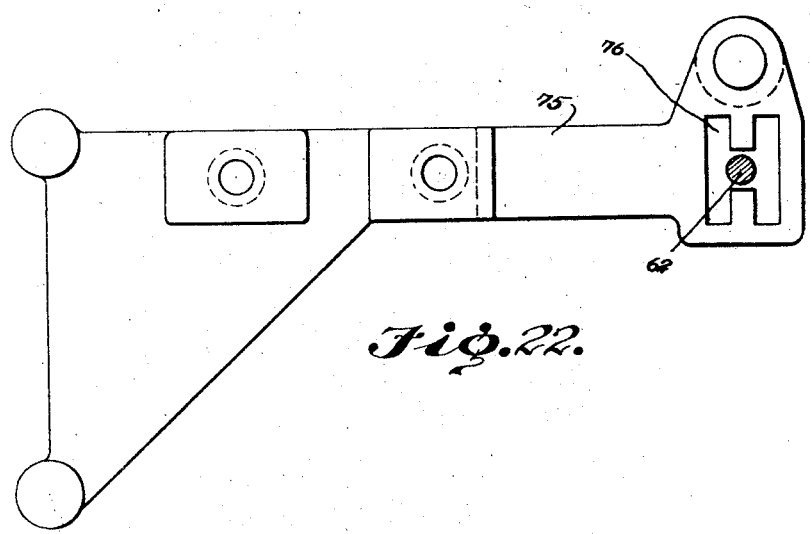
Figure 23:
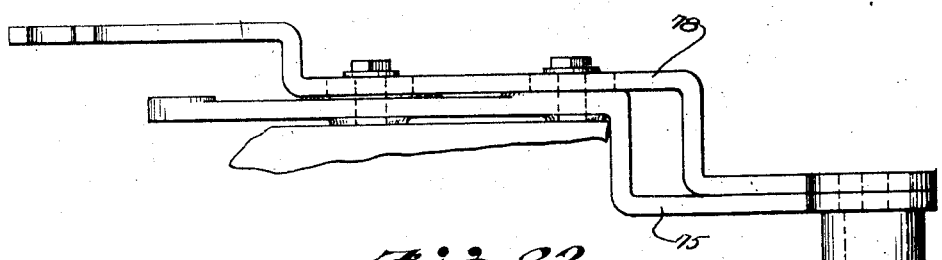

Similarly there is provided on the opposite side of the housing 44 a bevel gear 49 wherewith the two gears 37 and 38 also mesh. This gear is mounted on an inclined shaft 50 so as to revolve freely thereon, and is provided with a clutch face 51 cooperating with a clutch member 52 splined on the shaft 50. At the upper end of the shaft 50 there is provided a bevel gear 53 which meshes with a bevel gear 54 carried on a shaft 55. This shaft 55 extends into one of the jack heads as clearly shown in Figures 6 and 7, and carries on its inner end a bevel gear 56 which meshes with a similar bevel gear 57 having a polygonal opening therethrough for the reception of a vertical sliding shaft 58, the shaft thus rotating with the gear 57 while at the same time it is free to slide vertically through said gear. On one of the yokes 28 there is provided a housing 59 into which the lower end of the shaft 58 extends. On this lower end is a gear 60 which meshes with a bevel gear 61 fixed on one of the shafts 29, it being preferable that such shaft on this side of the device extend from one wheel 30 to the other so that power is transmitted to both wheels on one side. It will be obvious that this construction also permits, by proper manipulation of the clutches, the rotation of the wheels 30 in either direction at will.

In order to provide for the operation of all of the clutches by a single lever, the following mechanism is included in the device. At 62 is an operating lever which is supported in a ball and socket joint 63, and extends down below said joint, being provided at the downwardly extending portion with a ball 64 moving in a longitudinally disposed yoke 65 and fitting closely between the sides of said yoke. At 66 is a shipper lever for the clutch 46, and similarly at 67 is a shipper lever for the clutch 52. These two shipper levers are pivoted intermediate their ends to the housing 44, and have their upper arms connected by a bar 68 which carries the yoke 65. Under these circumstances, it will be seen that forward and backward movement of the lever 62 will not in any way affect the positions of the clutches 46 and 52. On the contrary, movement in either direction of the lever 62 will move one of these clutches into engagement and move the other away from its cooperating gear. The lever 62 is continued below the ball 64 and terminates at its lower end in a ball 69 sliding in a yoke 70 arranged transversely of the device and fitting closely in the sides of said yoke. At 71 is a rod which is fixed in the housing, and has slidably mounted thereon a collar 72 having an arm 73 extending therefrom and supporting the yoke 70. This collar also carries a shipper fork 74 which engages the clutch member 41 to actuate the same. It will now be seen that under these circumstances, the forward and backward movement of the lever 62 will move the clutch 41 to engage one or the other of the gears 37 and 38 in accordance with the direction of said movement.

From the foregoing it will be seen, by reference to Figures 16 to 19, that with the shaft 36 revolved, in the direction of the arrow in said figures, forward movement of the upper end of the lever 62 will clutch the gear 38 to said shaft, and movement to the left of the upper end of said lever 62 will clutch the gear 42 to the shaft 43 and cause the latter to revolve in the direction of the arrow in Fig. 16. Similarly, movement to the rear and left will produce the result shown in Fig. 17, movement to the front and right will engage the shaft 50 to move it in one direction as shown in Fig. 18, and movement to the rear and right will engage the shaft 50 to move it in the opposite direction as shown in Fig. 19.

For the purpose of regulating these movements, there is provided a plate 75 having an H-shaped slot 76 therein, as can be seen in Figures 17 to 19 inclusive. This plate 75 is carried at the end of an arm 77 having sliding connection with an arm 78 pivoted to the transmission housing of the device at 79, and it extends laterally at its forward end to form a pin and slot connection to said housing as at 80. In order to prevent too great movement of the jacks vertically, one of the jack screws is provided at one side with a slot 81 wherein is engaged one arm of a bell crank lever 82 which is connected by a link 83 with a rock arm 84 fixed on a rock shaft 85. This rock shaft 85 also carries a rock arm 86 which is connected by a link 87 with the shipper member 88 engageable with a cooperating shipper member 89. Now if the jack reaches the upper limit of its movement, it being assumed that the clutches are thrown in the proper direction to move the jack upward, the parts just described will unlock the operating lever and move it to central or neutral position. In like manner downward movement of the jack screw is similarly limited.

In order to prevent too rapid movement sideways, certain brake mechanism is also provided. To this end the housing 44 is enlarged as at 90, and within this enlarged portion there is fixed on the shaft 43 a brake drum 91 surrounded by a brake band 92 having one end fixed as at 93, and the other end connected to a bell crank lever 94 which, by means of a link 95 is connected to the brake operating lever 96 positioned convenient to the operator's seat.

From the foregoing it will be seen, that in general whenever it is desired to move the car sideways, it is simply necessary to move the operating lever 62 so as to cause the shaft 43 to revolve in the proper direction to force the supporting wheels or jack wheels downward. This will lift the car off its ordinary running wheel. The lever 62 will then be shifted to engage the shaft 50 and disengage the shaft 43. The engagement with the shaft 50 will move the car sideways in either direction and this sideways movement may be checked at any time by means of the brake. After the car is moved to the proper distance, the lever 62 is placed in neutral, and the brake being on, the car will remain in such position. The reverse of the operation for moving the car back to its original position, and lowering the same is obviously accomplished in a similar manner.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is wished to include all such as properly come within the scope claimed.

We claim:

1. In an automobile, a frame, a power plant including a driven shaft, extensible jacks carried by the frame and having ground wheels at their lower ends, actuating means for raising and lowering the jacks, other actuating means for driving the ground wheels in one direction and the other, the last mentioned actuating means being entirely separate from the first mentioned actuating means, means for selectively connecting the first and second actuating means to the driven shaft, and a single controlling device for said last mentioned means.

2. In an automobile, a frame, a power plant including a driven shaft, jacks carried by the frame and having vertically movable elements provided with ground wheels at their lower ends, actuating means connected to said movable elements to move the same vertically, other actuating means connected to said ground wheels to rotate the same, the last mentioned actuating means being entirely separate from the first mentioned actuating means each actuating means including a driving gear and a clutch for connecting each of said driving gears to the remainder of the respective actuating means, a clutch controlled reversing mechanism connected to said driving gears, and means for actuating the several clutches.

3. In an automobile, a frame, a power plant including a driven shaft, jacks carried by the frame and having vertically movable elements provided with ground wheels at their lower ends, actuating means connected to said movable elements to move the same vertically, other actuating means connected to said ground wheels to rotate the same, the last mentioned actuating means being entirely separate from the first mentioned actuating means, each actuating means including a driving gear and a clutch for connecting each of said driving gears to the remainder of the respective actuating means, a clutch controlled reversing mechanism connected to said driving gears, and a single operating lever controlling the several clutches selectively.

4. In an automobile, a frame, a power plant including a driven shaft, jacks carried by the frame and having vertically movable elements provided with ground wheels at their lower ends, actuating means connected to said movable elements to move the same vertically, other actuating means connected to said ground wheels to rotate the same, the last mentioned actuating means being entirely separate from the first mentioned actuating means, each actuating means including a driving gear and a clutch for connecting each of said driving gears to the remainder of the respective actuating means, a clutch controlled reversing mechanism connected to said driving gears, means for actuating the several clutches, and a stop mechanism for limiting the movement of the first mentioned actuating means.

5. In an automobile, a frame, a power plant including a driven shaft, jacks carried by the frame and having vertically movable elements provided with ground wheels at their lower ends, actuating means connected to said movable elements to move the same vertically, other actuating means connected to said ground wheels to rotate the same, the last mentioned actuating means being entirely separate from the first mentioned actuating means, each actuating means including a driving gear and a clutch for connecting each of said driving gears to the remainder of the respective actuating means, a clutch controlled reversing mechanism connected to said driving gears, a single operating lever controlling the several clutches selectively, and a stop mechanism for limiting the movement of the first mentioned actuating means.

6. In an automobile, a frame, a power plant including a driven shaft, jacks carried by the frame and having vertically movable elements provided with ground wheels at their lower ends, actuating means connected to said movable elements to move the same vertically, other actuating means connected to said ground wheels to rotate the same, each actuating means including a driving gear and a clutch for connecting each of said driving gears to the remainder of the respective actuating means, a clutch controlled reversing mechanism connected to said driving gears, said driving gears being confronting bevel gears, a shaft geared to said driven shaft and extending between said driving gears, a pair of confronting bevel gears revolubly mounted on said shaft and each meshing with both of said driving gears, a clutch on said shaft arranged for selectively connecting said pair of bevel gears thereto, and means for actuating the several clutches.

7. In an automobile, a frame, a power plant including a driven shaft, jacks carried by the frame and having vertically movable elements provided with ground wheels at their lower ends, actuating means connected to said movable elements to move the same vertically, other actuating means connected to said ground wheels to rotate the same, each actuating means including a driving gear and a clutch for connecting each of said driving gears to the remainder of the respective actuating means, a clutch controlled reversing mechanism connected to said driving gears, said driving gears being confronting bevel gears, a shaft geared to said driven shaft and extending between said driving gears, a pair of confronting bevel gears revolubly mounted on said shaft and each meshing with both of said driving gears, a clutch on said shaft arranged for selectively connecting said pair of bevel gears thereto, and a single operating lever controlling the several clutches selectively.

8. In an automobile, a frame, a power plant including a driven shaft, jacks carried by the frame and having vertically movable elements provided with ground wheels at their lower ends, actuating means connected to said movable elements to move the same vertically, other actuating means connected to said ground wheels to rotate the same, each actuating means including a driving gear and a clutch for connecting each of said driving gears to the remainder of the respective actuating means, a clutch controlled reversing mechanism connected to said driving gears, said driving gears being confronting bevel gears, a shaft geared to said driven shaft and extending between said driving gears, a pair of confronting bevel gears revolubly mounted on said shaft and each meshing with both of said driving gears, a clutch on said shaft arranged for selectively connecting said pair of bevel gears thereto, means for actuating the several clutches, and a stop mechanism for limiting the movement of the first mentioned actuating means.

9. In an automobile, a frame, a power plant including a driven shaft, jacks carried by the frame and having vertically movable elements provided with ground wheels at their lower ends, actuating means connected to said movable elements to move the same vertically, other actuating means connected to said ground wheels to rotate the same, each actuating means including a driving gear and a clutch for connecting each of said driving gears to the remainder of the respective actuating means, a clutch controlled reversing mechanism connected to said driving gears, said driving gears being confronting bevel gears, a shaft geared to said driving shaft and extending between said driving gears, a pair of confronting bevel gears revolubly mounted on said shaft and each meshing with both of said driving gears, a clutch on said shaft arranged for selectively connecting said pair of bevel gears thereto, a single operating lever controlling the several clutches selectively, and a stop mechanism for limiting the movement of the first mentioned actuating means.

10. In an automobile parking device, a frame, a power plant supported thereon, pairs of jacks on each side of said frame each consisting of a fixed member, a worm wheel threaded to form a nut and revoluble in said fixed member, and a threaded standard screwed into said nut; a shaft on each side of said frame carrying worms meshing with said worm wheels, a shaft extending transversely of the frame and geared to the last mentioned shafts, and an operative connection between said power plant and one of said shafts arranged to drive the shaft in either direction selectively.

11. In an automobile parking device, a frame, a power plant supported thereon, pairs of jacks on each side of said frame each consisting of a fixed member, a worm wheel threaded to form a nut and revoluble in said fixed member, and a threaded standard screwed into said nut; a shaft on each side of said frame carrying worms meshing with said worm wheels, a shaft extending transversely of the frame and geared to the last mentioned shafts, a driving shaft geared to one of said shafts, a bevel gear rotatable on the driving shaft, a clutch for connecting the bevel gear to its shaft, a shaft driven from said power plant, a pair of confronting bevel gears revolubly mounted on the last mentioned shaft and meshing with the first mentioned bevel gear, and a clutch mechanism for selectively connecting the gears of said pair to their shaft.

12. In an automobile parking device, a frame, a power plant supported thereon, pairs of jacks on each side of said frame each consisting of a fixed member, a worm wheel threaded to form a nut and revoluble in said fixed member, a threaded standard screwed into said nut; a shaft on each side of said frame carrying worms meshing with said worm wheels, a shaft extending transversely of the frame and geared to the last mentioned shafts, a driving shaft geared to one of said shafts, a bevel gear rotatable on the driving shaft, a clutch for connecting the bevel gear to its shaft, a shaft driven from said power plant, a pair of confronting bevel gears revolubly mounted on the last mentioned shaft and meshing with the first mentioned bevel gear, a clutch mechanism for selectively connecting the gears of said pair to their shaft, and a stop mechanism for disengaging the first clutch, said stop mechanism being connected to said clutch and including a member actuated by the movement of one of said standards.

13. In an automobile parking device, a frame, a power plant supported thereon, pairs of jacks on each side of said frame each consisting of a fixed member, a worm wheel threaded to form a nut and revoluble in said fixed member, a threaded standard screwed into said nut; a shaft on each side of said frame carrying worms meshing with said worm wheels, a shaft extending transversely of the frame and geared to the last mentioned shafts, an operative connection between said power plant and one of said shafts arranged to drive the shaft in either direction selectively, ground wheels supported on shafts journalled in the lower ends of said standards, the wheels on one side being carried on a shaft extending between the standards on said side, and reversible drive means connecting the power plant and last mentioned shaft.

14. In an automobile parking device, a frame, a power plant supported thereon, pairs of jacks on each side of said frame each consisting of a fixed member, a worm wheel threaded to form a nut and revoluble in said fixed member, a threaded standard screwed into said nut; a shaft on each side of said frame carrying worms meshing with said worm wheels, a shaft extending transversely of the frame and geared to the last mentioned shafts, an operative connection between said power plant and one of said shafts arranged to drive the shaft in either direction selectively, shafts journalled in the lower ends of said standards, ground wheels fixed on one of said shafts, a bevel gear on the last mentioned shaft, a driving bevel gear meshing with the last mentioned bevel gear, a vertical shaft carrying the driving bevel gear last mentioned, a bevel gear carried by the fixed jack member and having spline connection with the vertical shaft, and means for driving the last mentioned bevel gear from the power plant.

15. In an automobile parking device, a frame, a power plant supported thereon, pairs of jacks on each side of said frame each consisting of a fixed member, a worm wheel threaded to form a nut and revoluble in said fixed member, a threaded standard screwed into said nut; a shaft on each side of said frame carrying worms meshing with said worm wheels, a shaft extending transversely of the frame and geared to the last mentioned shafts, an operative connection between said power plant and one of said shafts arranged to drive the shaft in either direction, selectively, shafts journalled in the lower ends of said standards, ground wheels fixed on one of said shafts, a bevel gear on the last mentioned shaft, a driving bevel gear meshing with the last mentioned bevel gear, a vertical shaft carrying the driving bevel gear last mentioned, a bevel gear carried by the fixed jack member and having spline connection with the vertical shaft, means for driving the last mentioned bevel gear from the power plant, and including a shaft, a bevel gear revolubly mounted on said shaft and meshing with the pair of confronting bevel gears, and a clutch for connecting the last mentioned bevel gear to its shaft.

16. In an automobile parking device, a frame, a power plant supported thereon, pairs of jacks on each side of said frame each consisting of a fixed member, a worm wheel threaded to form a nut and revoluble in said fixed member, a threaded standard screwed into said nut: a shaft on each side of said frame carrying worms meshing with said worm wheels, a shaft extending transversely of the frame and geared to the last mentioned shafts, an operative connection between said power plant and one of said shafts arranged to drive the shaft in either direction selectively, shafts journalled in the lower ends of said standards, ground wheels fixed on one of said shafts, a bevel gear on the last mentioned shaft, a driving bevel gear meshing with the last mentioned bevel gear, a vertical shaft carrying the driving bevel gear last mentioned, a bevel gear carried by the fixed jack member and having spline connection with the vertical shaft, means for driving the last mentioned bevel gear from the power plant, and including a shaft, a bevel gear revolubly mounted on said shaft and meshing with the pair of confronting bevel gears, a clutch for connecting the last mentioned gear to its shaft, and a controlling device common to all the clutches and including a single control lever.

17. In an automobile parking device, a frame, a power plant supported thereon, pairs of jacks on each side of said frame each consisting of a fixed member, a worm wheel threaded to form a nut and revoluble in said fixed member, a threaded standard screwed into said nut; a shaft on each side of said frame carrying worms meshing with said worm wheels, a shaft extending transversely of the frame and geared to the last mentioned shafts, an operative connection between said power plant and one of said shafts arranged to drive the shaft in either direction selectively, shafts journalled in the lower ends of said standards, ground wheels fixed on one of said shafts, a bevel gear on the last mentioned shaft, a driving bevel gear meshing with the last mentioned bevel gear, a vertical shaft carrying the driving bevel gear last mentioned, a bevel gear carried by the fixed jack member and having spline connection with the vertical shaft, means for driving the last mentioned bevel gear from the power plant, and including a shaft, a bevel gear revolubly mounted on said shaft and meshing with the pair of confronting bevel gears, a clutch for connecting the last mentioned bevel gear to its shaft, and a brake on the last mentioned clutch provided shaft.

In testimony whereof we affix our signatures.

JOHN K. E. DIFFENDERFFER.
VILLOR P. WILLIAMS.
MIRIAM S. F. WILLIAMS.